UNITED STATES PATENT OFFICE.

LEVI S. JOHNSON AND MARVIN G. JOHNSON, OF CORTLAND, NEW YORK.

IMPROVEMENT IN ARTICLES OF FOOD.

Specification forming part of Letters Patent No. 136,165, dated February 25, 1873.

*To all whom it may concern:*

Be it known that we, LEVI S. JOHNSON and MARVIN G. JOHNSON, of Cortland, in the county of Cortland and State of New York, have jointly invented a Compound or Preparation of Beef for Table Use, of which the following is a specification:

In the manufacture of dried or smoked beef for the table as at present practiced, the best portions of the beef are used, and in the form of solid pieces or chunks. These pieces are submitted to a tedious process, consisting in preparing a pickle by boiling the solution of salt, saltpeter, and sugar, removing the scum, allowing the pickle to cool; after which the pieces are dipped, and finally smoked. Meat so prepared is liable to become hard and dry, which detracts from its delicacy. To avoid this the packer is now constrained to pack in considerable quantities under heavy pressure in strong boxes or kegs.

The object of our invention is to avoid the unnecessary labor implied in the foregoing process, to utilize the small scraps, and the portions of the animal containing too much bone to be profitably used in the old process; but which are perhaps the most tender and delicate portions of the carcass. To this end the nature of our invention consists in cutting raw lean beef very fine and mixing it with salt, saltpeter, and sugar, and packing and drying, or smoking the compound in bags.

To prepare the compound, we cut the lean of beef, in the raw state, very fine; with each one hundred pounds of the meat mix three quarts of salt, four pounds of sugar, and three to four ounces of saltpeter. At any time after the same is thoroughly mixed, but usually within twenty-four hours, pack the compound in narrow bags of white cloth, cotton or linen, and hang the bags in a warm room to dry for a few days; the cloth and the outside of the meat thus become dry, while the interior will for a long time remain damp. The bags of compound so prepared are then subjected to the ordinary smoking-process for a sufficient length of time to give the article the desired flavor. The dry preservative materials mixed with the meat will thoroughly permeate and season the mass, and act as effectually as if applied in solution; and if sufficient pressure is used in packing the tubes, the product will be as compact as is necessary, and a full equivalent for dried or smoked beef as now prepared.

The article thus prepared is impervious to flies and ordinary insects, and can be kept for a long time; and when wanted for use is cut in thin slices and takes the place of dried beef upon the table.

We do not claim the use of cylindrical tubes of cotton or other textile material for the purpose of preserving animal flesh or meat; but

What we claim as our invention is—

A beef compound, prepared substantially as and for the purpose above set forth, as an article of manufacture.

In testimony whereof we have signed our names to this specification in the presence of two subscribing witnesses.

LEVI S. JOHNSON.
    MARVIN G. JOHNSON.

Witnesses:
 EARL M. WOODWARD,
 JOHN DUFF.